(12) United States Patent
Atsumi

(10) Patent No.: US 11,257,020 B2
(45) Date of Patent: Feb. 22, 2022

(54) SEWING MANAGEMENT SYSTEM AND SEWING MANAGEMENT METHOD

(71) Applicant: JUKI CORPORATION, Tama (JP)

(72) Inventor: Tadashi Atsumi, Tama (JP)

(73) Assignee: JUKI CORPORATION, Tama (JP)

( * ) Notice: Subject to any disclaimer, the term of this patent is extended or adjusted under 35 U.S.C. 154(b) by 0 days.

(21) Appl. No.: 16/835,949

(22) Filed: Mar. 31, 2020

(65) Prior Publication Data

US 2020/0311645 A1    Oct. 1, 2020

(30) Foreign Application Priority Data

Apr. 1, 2019    (JP) ............................ JP2019-069806

(51) Int. Cl.
| | |
|---|---|
| *D05B 19/04* | (2006.01) |
| *G06Q 10/06* | (2012.01) |
| *G06Q 50/04* | (2012.01) |
| *G06Q 10/08* | (2012.01) |

(52) U.S. Cl.
CPC ....... *G06Q 10/06393* (2013.01); *D05B 19/04* (2013.01); *G06Q 10/06395* (2013.01); *G06Q 10/06398* (2013.01); *G06Q 10/087* (2013.01); *G06Q 50/04* (2013.01)

(58) Field of Classification Search
CPC ........ D05B 19/00; D05B 19/02; D05B 19/04; D05B 19/06; D05B 19/12; G06Q 10/06393; G06Q 10/06395; G06Q 10/06398; G06Q 10/087

USPC .......................................... 700/138, 136–137
See application file for complete search history.

(56) References Cited

U.S. PATENT DOCUMENTS

| | | | | |
|---|---|---|---|---|
| 5,881,657 A | * | 3/1999 | Asano ................... | D05B 19/12 112/102.5 |
| 5,974,992 A | * | 11/1999 | Asano ...................... | D05C 5/06 112/102.5 |
| 10,657,477 B2 | * | 5/2020 | Kudo .................. | G06Q 10/0633 |
| 2001/0004717 A1 | * | 6/2001 | Zhang ...................... | D05C 5/00 700/136 |
| 2003/0187538 A1 | * | 10/2003 | Somaia ................ | D03D 51/007 700/140 |
| 2008/0289552 A1 | * | 11/2008 | Kawaguchi .............. | D05B 1/12 112/445 |
| 2014/0257916 A1 | * | 9/2014 | Park ................... | G06Q 10/0633 705/7.27 |

FOREIGN PATENT DOCUMENTS

| | | | |
|---|---|---|---|
| JP | 10286384 A | * | 10/1998 |
| JP | 2001-276453 A | | 10/2001 |

* cited by examiner

*Primary Examiner* — Nathan E Durham
(74) *Attorney, Agent, or Firm* — Faegre Drinker Biddle & Reath LLP

(57) ABSTRACT

A sewing management system includes a sewing device that transmits a production management information including an identification information of an operator and an operation information of a device main body; and a management device that manages the production management information by a process unit of a product sewn in a sewing line or a component forming the product.

8 Claims, 5 Drawing Sheets

| No. | ITEM NUMBER ID | PROCESS ID | OPERATOR ID | SEWING MACHINE ID | STANDARD DATA | | | OPERATION DATA | | WORK VOLUME | NUMBER OF DEFECTS | ERROR | POSITION INFORMATION | COMPLETION DATE AND TIME |
|---|---|---|---|---|---|---|---|---|---|---|---|---|---|---|
| | | | | | STANDARD PARAMETER 1 STANDARD SEWING TIME | STANDARD PARAMETER 2 STANDARD SEWING SPEED | | OPERATION DATA 1 SEWING TIME | OPERATION DATA 2 SEWING SPEED | | | | | |
| 1 | TP01 | ST1 | OP1 | M01 | TS2 | NS2 | | TS3 | NS3 | 100 | 0 | 0 | --- | 2018/12/3 11:15 |
| 2 | TP01 | ST1 | OP2 | M02 | TS2 | NS2 | | TS3 | NS3 | 80 | 0 | 0 | N1:E1 | 2018/12/3 11:30 |
| 3 | TP01 | ST1 | OP3 | M03 | TS2 | NS2 | | TS1 | NS1 | 60 | 3 | 10 | --- | 2018/12/3 11:45 |
| 4 | TP01 | ST2 | OP1 | M04 | TS2 | NS2 | | TS3 | NS3 | 100 | 0 | 0 | --- | 2018/12/3 13:15 |
| 5 | TP01 | ST2 | OP2 | M05 | TS2 | NS2 | | TS2 | NS2 | 80 | 5 | 0 | S1:W1 | 2018/12/3 13:30 |
| 6 | TP01 | ST2 | OP3 | M06 | TS2 | NS2 | | TS1 | NS1 | 60 | 0 | 20 | N2:W2 | 2018/12/3 13:45 |
| 7 | TP01 | ST3 | OP1 | M07 | TS2 | NS2 | | TS3 | NS3 | 100 | 0 | 0 | --- | 2018/12/3 14:15 |
| 8 | TP01 | ST3 | OP2 | M08 | TS2 | NS2 | | TS1 | NS1 | 70 | 0 | 0 | --- | 2018/12/3 14:30 |
| 9 | TP01 | ST3 | OP3 | M09 | TS2 | NS2 | | TS1 | NS1 | 60 | 5 | 15 | --- | 2018/12/3 14:45 |
| ... | ... | ... | ... | ... | ... | ... | | ... | ... | ... | ... | ... | ... | ... |
| 10 | TP02 | ST4 | OP1 | M10 | TS2 | NS2 | | | | | | | | |
| | TP02 | ST4 | OP2 | M11 | TS2 | NS2 | | | | | | | | |
| | TP02 | ST4 | OP3 | M12 | TS2 | NS2 | | | | | | | | |
| ... | ... | ... | ... | ... | ... | ... | | | | | | | | |
| | TP03 | ST5 | OP1 | M13 | TS2 | NS2 | | | | | | | | |
| | TP03 | ST5 | OP2 | M14 | TS2 | NS2 | | | | | | | | |
| | TP03 | ST5 | OP3 | M15 | TS2 | NS2 | | | | | | | | |

| No. | OPERATOR ID | PROCESS ID | SKILL |
|---|---|---|---|
| 1 | OP1 | ST1 | 100 |
| 2 | OP1 | ST2 | ... |
| 3 | OP1 | ST3 | ... |
| 4 | OP2 | ST1 | 80 |
| 5 | OP2 | ST2 | ... |
| 6 | OP2 | ST3 | ... |
| 7 | OP3 | ST1 | 57 |
| 8 | OP3 | ST2 | ... |
| 9 | OP3 | ST3 | ... | ium including a first storage region for storing sewing scheduled information, a second storage region for storing sewing data, and a

SEWING MANAGEMENT SYSTEM AND SEWING MANAGEMENT METHOD

CROSS-REFERENCE TO RELATED APPLICATIONS

This application is based on and claims priority under 35 USC 119 from Japanese Patent Application No. 2019-069806 filed on Apr. 1, 2019.

TECHNICAL FIELD

The present invention relates to a sewing management system and a sewing management method.

BACKGROUND ART

In a related art, a sewing management system, in which a series of sewing procedures and sewing data when performing sewing can be simply and surely selected and production management data such as sewing history data during sewing work can be easily collected (for example, refer to JP-A-2001-276453), has been known. The sewing management system includes a removable storage medium including a first storage region for storing sewing scheduled information, a second storage region for storing sewing data, and a third storage region for storing production management information. As a result, since the production management information during the sewing work is stored in a recording medium for each sewing work and each sewing machine to perform highly accurate multi-dimensional information analysis, the productivity of production control in the sewing work can be improved.

However, in the sewing management system described above, the production management information stored in the recording medium does not include operator-related information including a sewing skill of an operator performing the sewing work. Therefore, it is not assumed that sewing product quality and production efficiency considering the sewing skill of the operator in the sewing line are improved. In a sewing factory, it is required to improve the sewing product quality and the production efficiency in the sewing line considering the sewing skill of the operator.

SUMMARY OF INVENTION

The present invention has been made considering the above-described problems, and an aspect thereof provides a sewing management system and a sewing management method capable of improving sewing product quality and production efficiency in a sewing line.

An embodiment of the present invention relates to a sewing management system, which includes:

a sewing device that transmits a production management information including an identification information of an operator and an operation information of a device main body; and a management device that manages the production management information by a process unit of a product sewn in a sewing line or a component forming the product An embodiment of the present invention relates to a sewing management method using a sewing device that performs sewing in a sewing line and a management device that manages various information in the sewing line, which includes:

transmitting, from the sewing device, a production management information including an identification information of an operator and an operation information of the sewing device body; and managing, by the management device, the production management information by a process unit of a product sewn in the sewing line or by a process unit of a component forming the product.

According to the above embodiments of the present invention, since production management information including identification information of an operator and operation information of a device main body is managed by a process unit of a product sewn in a sewing line or a component forming the product, a sewing skill of the operator working in the sewing line can be estimated for each process of the product or for each process of the component. Accordingly, it is possible to improve sewing product quality and production efficiency in the sewing line by setting personnel arrangement in the sewing line.

BRIEF DESCRIPTION OF DRAWINGS

FIG. 5 is an explanatory diagram of an example of a production management information table stored in a table storing unit of the management server;

FIG. 7 is an explanatory diagram of an example of a sewing skill table stored in the table storing unit of the management server.

DESCRIPTION OF EMBODIMENTS

Figure 1:
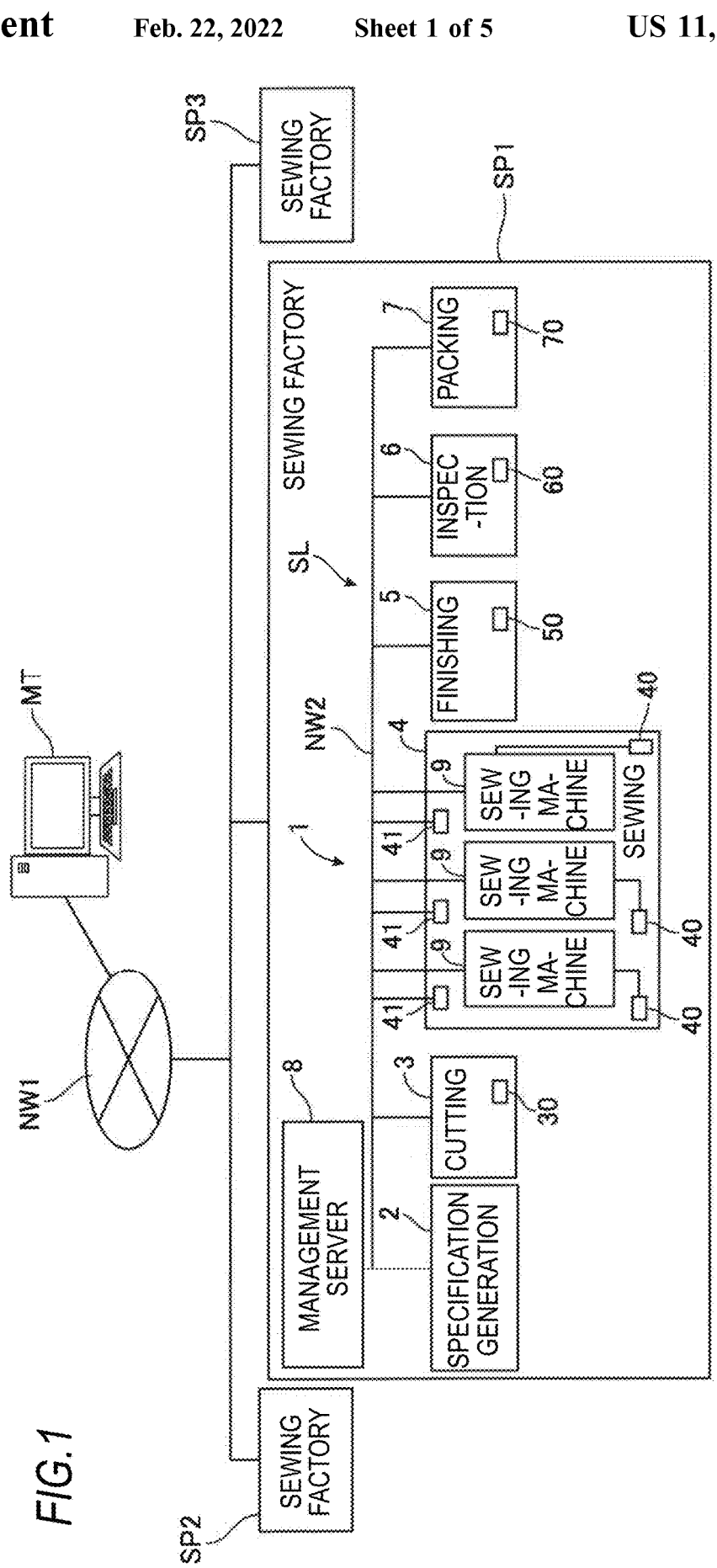
FIG. 1 is a network configuration diagram of a sewing management system according to an embodiment.

Hereinafter, a sewing management system will be described with reference to the accompanying drawings. FIG. 1 is a network configuration diagram of a sewing management system 1 according to the embodiment. As illustrated in FIG. 1, the sewing management system 1 is applied to a sewing line SL constructed in a sewing factory SP (SP1 to SP3), and aims to improve sewing product quality and production efficiency in the sewing line SL. In FIG. 1, details of the sewing line SL are described only in the sewing factory SP1, and descriptions of the sewing factories SP2 and SP3 will be omitted.

The sewing factory SP (SP1 to SP3) illustrated in FIG. 1 is connected to a network NW1 such as the Internet. A person involved in the sewing factory SP (for example, an employee of a company that owns the sewing factory SP and a supplier who supplies facilities to the sewing factory SP) can confirm an operating state of the sewing factory SP from a management terminal MT. For example, the management terminal MT can confirm the operation state of the sewing factory SP by acquiring information managed by a management server 8 in the sewing factory SP which will be described later. The setting of various parameters in the sewing line SL can be changed from the management terminal MT. The management terminal MT is configured with a general personal computer (PC) and a tablet PC, or a smartphone.

The sewing line SL includes a plurality of processes for producing a single or a plurality of sewing products (hereinafter, simply referred to as a "product"). The sewing line SL illustrated in FIG. 1 includes a specification generation process 2, a cutting process 3, a sewing process 4, a finishing process 5, an inspection process 6, and a packing process 7. A process of forming the sewing line SL is not limited to the example illustrated in FIG. 1, and can be appropriately changed. Here, a line including a plurality of processes illustrated in FIG. 1 is referred to as the sewing line SL, but the name thereof is not limited thereto and can be appropriately changed. In the following description, an object in a process of manufacturing a product is referred to as a workpiece as appropriate.

In an execution region of various processes included in the sewing line SL, facilities necessary for executing the corresponding work process are installed. In the sewing management system 1 according to the embodiment, these facilities are directly or indirectly connected to each other via a network (for example, LAN or WAN) NW2 constructed in the sewing factory SP. A management server 8 serving as a management device for managing the overall system is connected to the network NW2. As described in more detail hereinafter, the management server 8 manages various information outputted from the facilities of each process, and further analyzes a sewing skill of an operator in the sewing line SL, and the sewing product quality and the production efficiency in the sewing line SL based upon the managed information. Hereinafter, a content of each process included in the sewing line SL and the facilities to be installed therein will be described.

The specification generation process 2 is a process of generating a specification of a product to be sewn in the sewing line SL, and a process of setting sewing data for sewing the product according to the generated specification, a parameter (hereinafter, referred to as a "setting parameter") set in various facilities required until the product is packed, and standard time. For example, in an execution region of the specification generation process 2, as the facilities, a personal computer (PC) on which an application such as a computer-aided design (CAD) and a computer-aided manufacturing (CAM) is mounted is provided. The PC is connected to the network NW2 of the sewing management system 1. The PC in the specification generation process 2 outputs the specification, the sewing data, the setting parameter, and the standard time to the management server 8.

The cutting process 3 is a process of cutting a cloth based upon the specification and the CAD and CAM data. For example, in an execution region of the cutting process 3, as the facilities, a stretching machine, a spreading and shrinking machine, a cutting machine, and a portable terminal 30 connected to the cutting machine by wire or wirelessly are provided. The portable terminal 30 is connected to the network NW2 of the sewing management system 1. In the cutting process 3, the cloth wound in a roll shape is spread by the spreading and shrinking machine, and cut by the cutting machine in a state where distortion and wrinkles of the cloth are removed. An RFID tag is mounted on the cloth after cutting. An item number ID indicating identification information of a product or a component is recorded in the RFID tag. The portable terminal 30 connected to the cutting machine outputs information such as the item number ID read by a terminal main body and the number of pieces cut by the cutting machine outputted from the cutting machine to the management server 8.

The sewing process 4 is a process of sewing the cloth cut in the cutting process 3 based upon the specification, the sewing data, and the setting parameter. In an execution region of the sewing process 4, a sewing machine 9 as a single or a plurality of sewing devices, a portable terminal 40 connected to the sewing machine 9 by wire or wirelessly, and a conveyance device for conveying the workpiece are provided. The sewing machine 9 and the portable terminal 40 are connected to the network NW2 of the sewing management system 1. The sewing machine 9 outputs information such as operation data, error data, and work volume data to the management server 8. The sewing machine 9 outputs information such as an item number ID and an operator ID read by the portable terminal 40 connected to the sewing machine 9 to the management server 8.

At a predetermined position in the execution region of the sewing process 4, a position detecting device 41 that detects position information of the operator is installed. The position detecting device 41 reads an operator ID in an ID card carried by the operator in a non-contact manner. The position detecting device 41 is configured to be able to detect the position of the operator at any position within the detectable region. The position detecting device 41 is connected to the network NW2 of the sewing management system 1. The position detecting device 41 outputs the detected position information of the operator to the management server 8 via the network NW2. Any method such as RFID, beacon, GPS, or image recognition can be adopted as a position detecting method by the position detecting device 41.

The finishing process 5 is a process of performing the final finishing before an inspection process such as iron press, buttoning, and thread cutting with respect to the workpiece sewn in the sewing process 4 based upon the specification. In an execution region of the finishing process 5, an iron press machine and a portable terminal 50 connected thereto by wire or wirelessly are provided. The portable terminal 50 is connected to the network NW2 of the sewing management system 1. In addition to the item number ID and the operator ID read by the terminal main body, the portable terminal 50 connected to the iron press machine outputs information such as work volume data outputted from the iron press machine to the management server 8.

The inspection process 6 is a process of inspecting the workpiece finally finished in the finishing process 5 based upon the specification. In an execution region of the inspection process 6, an inspection table, an inspection machine, a meter reading device, a portable terminal 60 connected thereto are provided. The portable terminal 60 is connected to the network NW2 of the sewing management system 1. The inspection machine is configured to be able to input an inspection result of the workpiece by an inspector and the number of workpieces whose inspection is performed by the inspector. In addition to the item number ID and the operator ID read by the terminal main body, the portable terminal 60 connected to the inspection machine outputs information such as the inspection result, the work volume data, and the defect data outputted from the inspection machine to the management server 8.

The packing process 7 is a process of packing the workpiece inspected in the inspection process 6 based upon the specification. In an execution region of the packing process 7, a tagging machine and a portable terminal 70 connected thereto by wire or wirelessly are provided. The portable terminal 70 is connected to the network NW2 of the sewing management system 1. In addition to the item number ID and the operator ID read by the terminal main body, the portable terminal 70 connected to the tagging machine outputs information such as work volume data and completion date and time outputted from the tagging machine to the management server 8.

The sewing management system 1 according to the embodiment is configured to include the management server 8 and a part or all of facilities of various processes. For example, the sewing management system 1 is configured to include, as an example of facilities, the sewing machine 9 and the position detecting device 41 in the sewing process 4, and the portable terminals 30, 40, 50, 60, and 70 in various processes. However, the configuration of the sewing management system 1 is not limited thereto, and can be appropriately changed.

Figure 2:
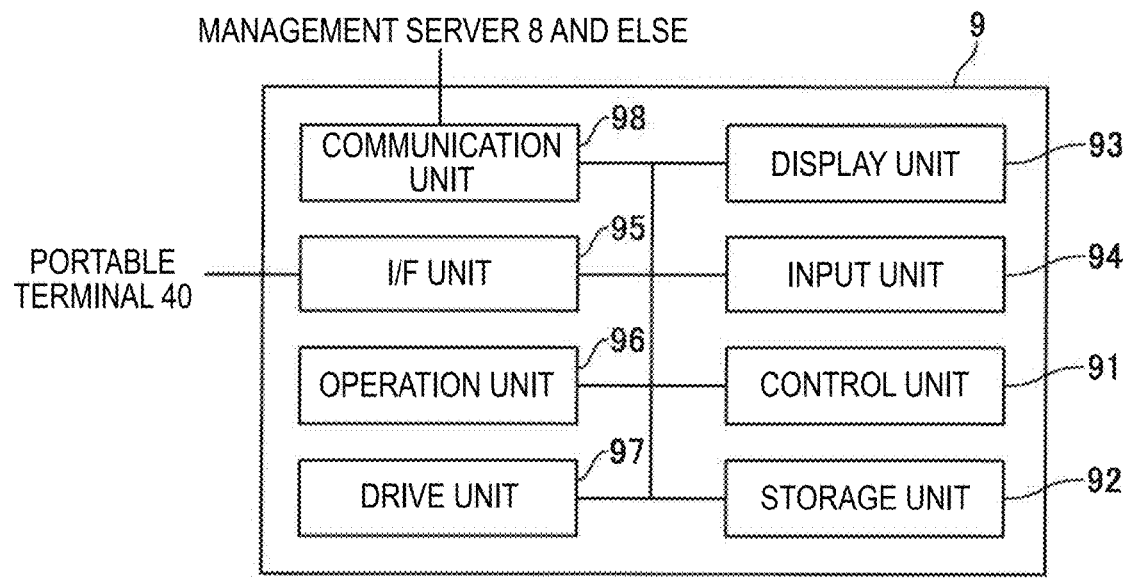
FIG. 2 is a block diagram illustrating a configuration of a sewing machine provided in the sewing management system.
Figure 3:
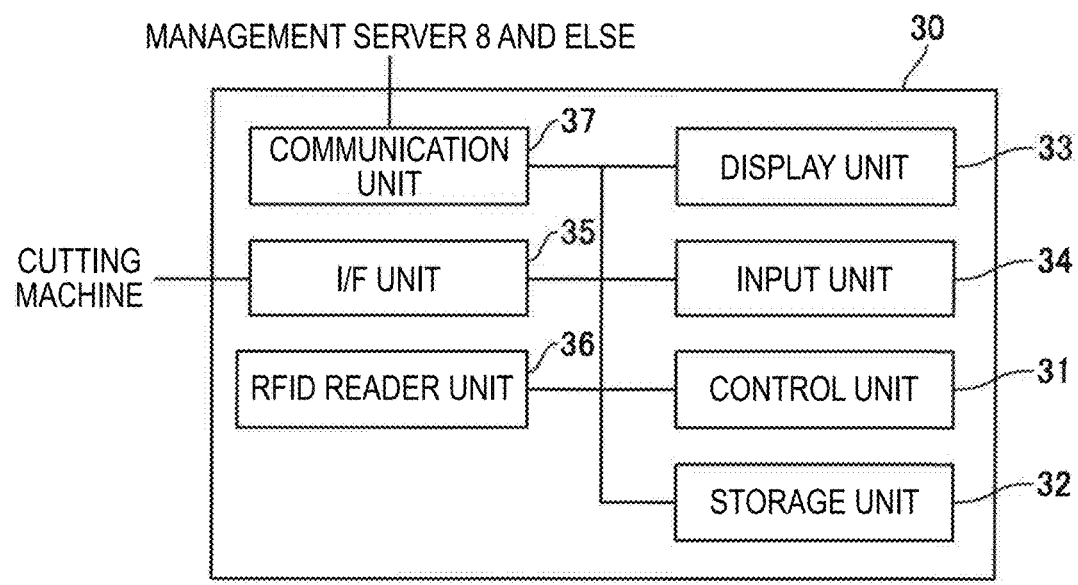
FIG. 3 is a block diagram illustrating a configuration of a portable terminal provided in the sewing management system.

Here, the configurations of the sewing machine 9 and the portable terminals 30, 40, 50, 60, and 70 that form the sewing management system 1 according to the embodiment will be described with reference to FIGS. 2 and 3. Since the portable terminals 30, 40, 50, 60, and 70 basically have a common configuration, the portable terminal 30 will be described as a representative. FIG. 2 is a block diagram illustrating a configuration of the sewing machine 9 provided in the sewing management system 1 according to the embodiment. FIG. 3 is a block diagram illustrating a configuration of the portable terminal 30 provided in the sewing management system 1 according to the embodiment.

As illustrated in FIG. 2, the sewing machine 9 includes a control unit 91 that controls the overall sewing machine 9, a storage unit 92, a display unit 93, an input unit 94, and an interface unit (I/F unit) 95, an operation unit 96, a drive unit 97, and a communication unit 98 connected to the control unit 91. The control unit 91 is configured with a central calculation unit such as a CPU. The storage unit 92 stores a program to be executed by the control unit 91 and functions as a work region of the control unit 91.

The display unit 93 displays information necessary for the operation of the sewing machine 9. For example, the display unit 93 displays an operation screen for operating the sewing machine 9, the item number ID of the workpiece, the setting parameter for the workpiece. The input unit 94 receives an instruction inputted from an operator. For example, the input unit 94 receives input of a change instruction of the setting parameter with respect to the sewing machine 9 from the operator. In FIG. 2, the display unit 93 and the input unit 94 have different configurations, and the present invention is not limited thereto. For example, functions of the display unit 93 and the input unit 94 may be provided with a touch panel.

The I/F unit 95 forms an interface between an external terminal and the control unit 91. The portable terminal 40 is connected to the I/F unit 95. Information is exchanged between the sewing machine 9 and the portable terminal 40 via the I/F unit 95. For example, the item number ID and the operator ID read by the portable terminal 40 are outputted to the sewing machine 9, and the operation data and the work volume data in the sewing machine 9 are outputted to the portable terminal 40.

The operation unit 96 receives a drive operation from the operator. For example, the operation unit 96 receives a drive operation of a needle operation (for example, a start and end operation of the needle operation, and an operation of indicating a needle operation direction) from the operator. The drive unit 97 drives a sewing machine needle in response to the drive operation from the operator. The communication unit 98 communicates with the management server 8 via the network NW2 of the sewing management system 1. For example, the communication unit 98 transmits the item number ID and the operator ID read via the portable terminal 40, the operation information in the drive unit 97, and the work volume data in the sewing machine 9 to the management server 8.

According to the above-described configuration, the sewing machine 9 performs sewing in response to the instruction of the operator from the operation unit 96. The drive at the time of sewing is performed according to the setting parameter set in the specification generation process 2. For example, the sewing is performed in response to a feeding speed of the workpiece and a needle operation speed set as the setting parameter. The setting parameter in the sewing machine 9 can be changed from the input unit 94 in response to the sewing skill of the operator. The setting parameter changed by the operator is outputted to the management server 8 via the communication unit 98. The operation information of the drive unit 97 in response to the parameter set in advance (or a changed setting parameter) is outputted to the management server 8 via the communication unit 98.

As illustrated in FIG. 3, the portable terminal 30 includes a control unit 31 that controls the overall terminal, a storage unit 32, a display unit 33, an input unit 34, and an interface unit (I/F unit) 35, an RFID reader unit 36, and a communication unit 37 connected to the control unit 31. The control unit 31 is configured with a central calculation unit such as a CPU. The storage unit 32 stores a program to be executed by the control unit 31 and functions as a work region of the control unit 31.

The display unit 33 displays information necessary for the operation of the portable terminal 30. For example, the display unit 33 displays an operation screen for operating the portable terminal 30, and the item number ID and the operator ID read by the RFID reader unit 36 which will be described later. The input unit 34 receives input such as an operation instruction from the operator. For example, the input unit 34 receives a reading instruction of the operator ID and the item number ID from the operator. In FIG. 3, the display unit 33 and the input unit 34 have different configurations, and the present invention is not limited thereto. For example, functions of the display unit 33 and the input unit 34 may be provided with a touch panel.

The I/F unit 35 forms an interface between the external terminal and the control unit 31. The cutting machine is connected to the I/F unit 35. Information is exchanged between the cutting machine and the portable terminal 30 via the I/F unit 35. For example, the number of pieces cut by the cutting machine is outputted to the portable terminal 30. The RFID reader unit 36 reads the operator ID in the ID card carried by the operator and the item number ID in the RFID tag mounted on the cloth in a non-contact manner. The communication unit 37 communicates with the management server 8 via the network NW2 of the sewing management system 1. For example, the communication unit 37 transmits information such as the operator ID and the item number ID read via the RFID reader unit 36, and the number of pieces cut by the cutting machine received via the I/F unit 35 to the management server 8.

According to the above-described configuration, the portable terminal 30 receives the number of pieces cut by the cutting machine via the I/F unit 35. The portable terminal 30 reads the operator ID in the ID card carried by the operator and the item number ID in the RFID tag mounted on the cloth in response to the instruction from the input unit 34. The number of pieces cut thereby, the operator ID, and the item number ID are outputted to the management server 8 via the communication unit 37.

The portable terminals 40, 50, 60, and 70 in the sewing process 4, the finishing process 5, the inspection process 6, and the packing process 7 have different targets to be connected via the I/F unit, and have different information to communicate with the connected target. The sewing machine 9 is connected to the portable terminal 40 and outputs the item number ID to the sewing machine 9. The iron press machine is connected to the portable terminal 50, and receives the work volume data. The inspection machine is connected to the portable terminal 60, and receives the inspection result, the work volume data, and the defect data. The tagging machine is connected to the portable terminal 70, and receives the work volume data and the completion date and time.

The management server 8 manages information outputted from the facilities of various processes. These pieces of information are used as information for managing production in the sewing line SL. Hereinafter, for the convenience of description, these pieces of information will be referred to as "production management information". The management server 8 manages the production management information for each product unit sewn in the sewing line SL or for each component unit forming the product. Next, the management server 8 estimates and manages the sewing skill of the operator based upon the production management information, and analyzes the sewing product quality and the production efficiency in the sewing line SL according to the estimation result. The production management information managed by the management server 8 will be described later.

Figure 4:
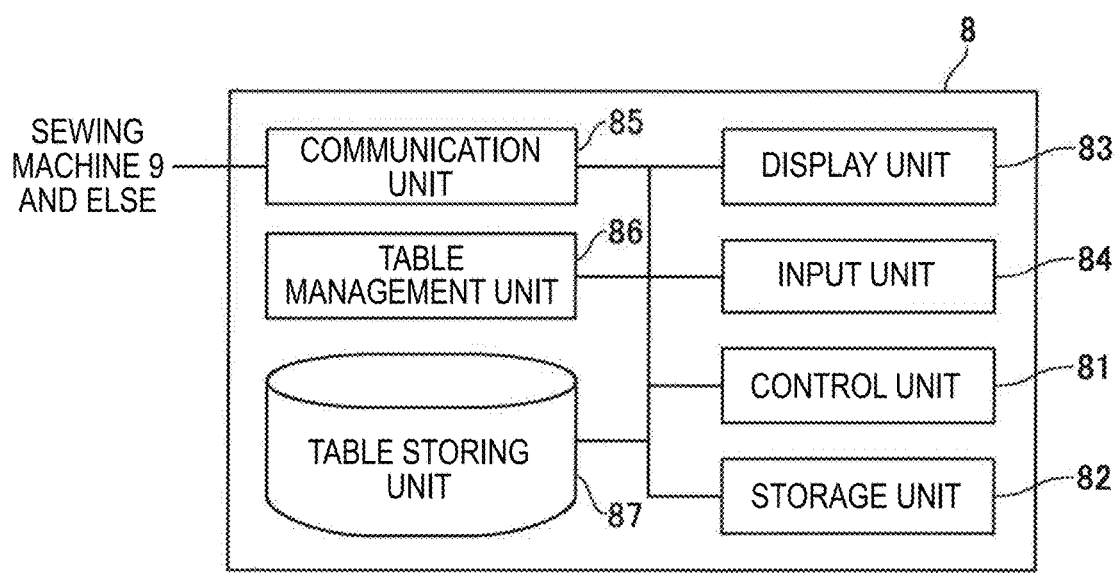
FIG. 4 is a block diagram illustrating a configuration of a management server provided in the sewing management system.

FIG. 4 is a block diagram illustrating a configuration of the management server 8 forming the sewing management system 1 according to the embodiment. As illustrated in FIG. 4, the management server 8 includes a control unit 81 that controls the overall server, a storage unit 82, a display unit 83, an input unit 84, a communication unit 85, a table management unit 86, and a table storing unit 87 connected to the control unit 81. The control unit 81 is configured with a central calculation unit such as a CPU. The storage unit 82 stores a program to be executed by the control unit 81 and functions as a work region of the control unit 81.

The display unit 83 displays information necessary for the operation of the management server 8. For example, the display unit 83 displays an operation screen for operating the management server 8, and an analysis result screen for displaying an analysis result of the sewing line SL based upon the production management information. The input unit 84 receives input such as an operation instruction from an administrator of the management server 8. For example, the input unit 84 receives an analysis instruction of the sewing line SL from the administrator. In FIG. 4, the display unit 83 and the input unit 84 have different configurations, but the present invention is not limited thereto. For example, functions of the display unit 83 and the input unit 84 may be provided with a touch panel.

The communication unit 85 communicates with the facilities of various processes of the sewing line SL via the network NW2 of the sewing management system 1. For example, the communication unit 85 receives the production management information including the operator ID and the operation information in the drive unit 97 from the sewing machine 9 in the sewing process 4. The table management unit 86 generates a production management information table from the production management information received from the communication unit 85, and manages the production management information. The table storing unit 87 stores the production management information table generated by the table management unit 86 and a sewing skill table which will be described later.

Here, an example of the production management information table stored in the table storing unit 87 will be described with reference to FIG. 5. FIG. 5 is an explanatory diagram of an example of a production management information table 500 stored in the table storing unit 87 of the management server 8 according to the embodiment. A registered content of the production management information table 500 stored in the table storing unit 87 is not limited to the content shown in FIG. 5, and can be appropriately changed.

In the production management information table 500 illustrated in FIG. 5, the production management information on item number IDs (TP01 to TP03) associated with one part of a T-shirt which is a product is registered. For example, the item number IDs "TP01", "TP02", and "TP03" are associated with sewing works respectively corresponding to a "body part", a "sleeve" and a "collar" of the T-shirt which is the product. An operation for sewing a front body part and a rear body part is associated with the item number ID "TP01". Operations for sewing a sleeve and a collar in the front and rear body parts are respectively associated with the item number IDs "TP02" and "TP03". The contents of these item number IDs are determined based upon information from a PC in the specification generation process 2, and registered based upon the information from the portable terminal 30 in the cutting process 3.

In the production management information table 500, as standard data, a standard sewing time is registered as a standard parameter 1 (parameter 1), and a standard sewing speed is registered as a standard parameter 2 (parameter 2). The standard parameter 1 is set with "TS3" indicating a fast sewing time, "TS1" indicating a slow sewing time, and "TS2" indicating an intermediate sewing time thereof. The standard parameter 2 is set with "NS3" indicating a fast sewing speed, "NS1" indicating a slow sewing speed, and "NS2" indicating an intermediate sewing speed thereof. The contents of these standard parameters 1 and 2 are registered based upon the information from the PC in the specification generation process 2.

In the production management information table 500, the production management information when three different operators perform the sewing work by using three different sewing machines 9 is registered in the respective item number IDs "TP01", "TP02", and "TP03". Each of the three operators is associated with operator IDs (OP1 to OP3). Each of the three sewing machines 9 is associated with sewing machine IDs (M1 to M3). The operator ID and the sewing machine ID are set in advance by the administrator of the sewing management system 1, and registered based upon information from the sewing machine 9 in the sewing process 4.

In the production management information table 500, an actual sewing time in the sewing machine 9 is registered as operation data 1, and an actual sewing speed in the sewing machine 9 is registered as operation data 2. The contents registered in the operation data 1 and 2 are respectively the same as the standard parameters 1 and 2. In other words, "TS1", "TS2", or "TS3" are registered as the sewing time, and "NS1", "NS2", or "NS3" are registered as the sewing speed. The contents of the operation data 1 and 2 are registered based upon the information from the sewing machine 9 in the sewing process 4.

In the production management information table 500, position information of the operator of the sewing machine 9 is registered. As a content registered in the position information, a distance away from east, west, south, and north directions is registered with reference to a position of the position detecting device 41 installed in the sewing process 4. For example, in the production management information of the number #2, "N1:E1" is registered. "N1: E1" indicates that the operator moves to a position separated by one block in the north direction and by one block in the east direction from the position of the position detecting device 41. Here, the "block" is a unit of a predetermined distance. In the same manner, "N2:E2" is registered in the production management information with the number #6. "N2:E2" indicates that the operator moves to a position separated by two blocks in the north direction and by two blocks in the west direction from the position of the position detecting device 41. The contents of the position information are registered based upon information from the position detecting device 41 in the sewing process 4.

In the production management information table 500, the work volume data, inspection result (number of defects) data, defect (error) data, and completion date and time data of the product (workpiece) are registered. In the work volume data, the quantity of the product whose sewing is completed by the sewing machine 9 is registered, and in the inspection result data, the inspection result of the product is registered. In the former, the actual number of products is registered, and in the latter, for example, a defect rate (or a non-defect rate) is registered. In the defect data, the number of times of occurrence of the defect in the sewing machine 9 is registered, and in the completion date and time, the date and time when the packing work is completed is registered. In the former, the actual number of times of occurrence of the defect in the sewing machine 9 (for example, a feeding error and a needle operation error of the workpiece) is registered. The work volume data are registered based upon the information from the sewing machine 9 in the sewing process 4. The contents of the inspection result data and the defect data are registered based upon information from the portable terminal 60 in the inspection process 6. The contents of the completion date and time data are registered based upon information from the portable terminal 70 in the packing process 7.

In the production management information table 500 illustrated in FIG. 5, as shown in the numbers #1 to #3, in the item number ID "TP01", three different operators (operators of OP1 to OP3) perform the sewing work of the same process (ST1) by using three different sewing machines 9 (M01 to M03). The operators of OP1 and OP2 actually work at the sewing time of TS3 and the sewing speed of NS3 with respect to the sewing time (TS2) and the sewing speed (NS2) set by the standard parameters 1 and 2. On the other hand, the operator of OP3 actually works at the sewing time of TS1 and the sewing speed of NS1 with respect to the sewing time (TS2) and the sewing speed (NS2) set by the sewing parameters 1 and 2. In other words, the sewing time and the sewing speed are different depending on the operator.

The operators of OP1 and OP3 do not move from a reference position (an installation position of the position detecting device 41), whereas the operator of OP2 moves by one block from the reference position to the northeast side. The work volume data of the products of the operators of OP1, OP2, and OP3 are respectively 100 pieces, 80 pieces, and 60 pieces. The inspection results of the products of the operators of OP1 and OP2 are the number of defects "0", whereas the inspection result of the product of OP3 is the number of defects "3". The defect does not occur in the sewing machine 9 of M01 and M02, whereas the defect occurs 10 times in the sewing machine 9 of M03. That the completion time of the product by the operator of OP1 is the earliest (11:15 on Dec. 3, 2018) and the completion time of the product by the operators of OP2 and OP3 continues in that order (11:30 and 11:45 on the same day, respectively).

Here, a registration mode of the above-described production management information will be described with reference to FIGS. 1, 4, and 5. For example, in the sewing process 4, when the operator reads the item number ID and the operator ID with the RFID reader of the portable terminal 40, these pieces of information are outputted to the management server 8 via the sewing machine 9 as the production management information, and recorded in the storage unit 82. Here, the sewing machine ID of the sewing machine 9 to which the portable terminal 40 is connected is also outputted to the management server 8, and recorded in the storage unit 82. The information such as the sewing data and the standard parameter outputted from the specification generation process 2 is also recorded in the storage unit 82. When the item number ID, the process ID, the operator ID, and the sewing machine ID are recorded in the storage unit 82, the table management unit 86 calls the standard parameters 1 and 2 based upon the item number ID, and registers these pieces of information in the production management information table 500. Accordingly, the item number ID, the standard parameter 1, the standard parameter 2, the operator ID, and the sewing machine ID are registered in the production management information table 500.

Next, in the sewing process 4, when actual sewing work is performed, the operation data and the work volume data associated with the sewing work are outputted to the management server 8, and recorded in the storage unit 82. The position information of the operator is outputted from the position detecting device 41 in the sewing process 4 to the management server 8, and recorded in the storage unit 82. When these pieces of data and information are recorded in the storage unit 82, the table management unit 86 registers the operation data, the work volume data, and the position information of the operator in the production management information table 500. As a result, the operation data 1, the operation data 2, the position information of the operator, and the work volume data are registered in the production management information table 500.

In the inspection process 6, when the inspection of the product (the workpiece) is performed, the inspection result data of the product and the defect data in the sewing machine 9 are outputted from the portable terminal 60 to the management server 8, and recorded in the storage unit 82. When these pieces of data are recorded in the storage unit 82, the table management unit 86 registers the inspection result data and the defect data in the production management information table 500. Accordingly, the inspection result data and the defect data are registered in the production management information table 500.

In the packing process 7, when the workpiece is packed, the completion date and time data are outputted from the portable terminal 70 to the management server 8, and recorded in the storage unit 82. When the completion date and time data are recorded in the storage unit 82, the table management unit 86 registers the completion date and time data in the production management information table 500. Accordingly, the completion date and time data are registered in the production management information table 500. All pieces of the production management information in the production management information table 500 shown in FIG. 5 are registered in this manner.

Figure 6:
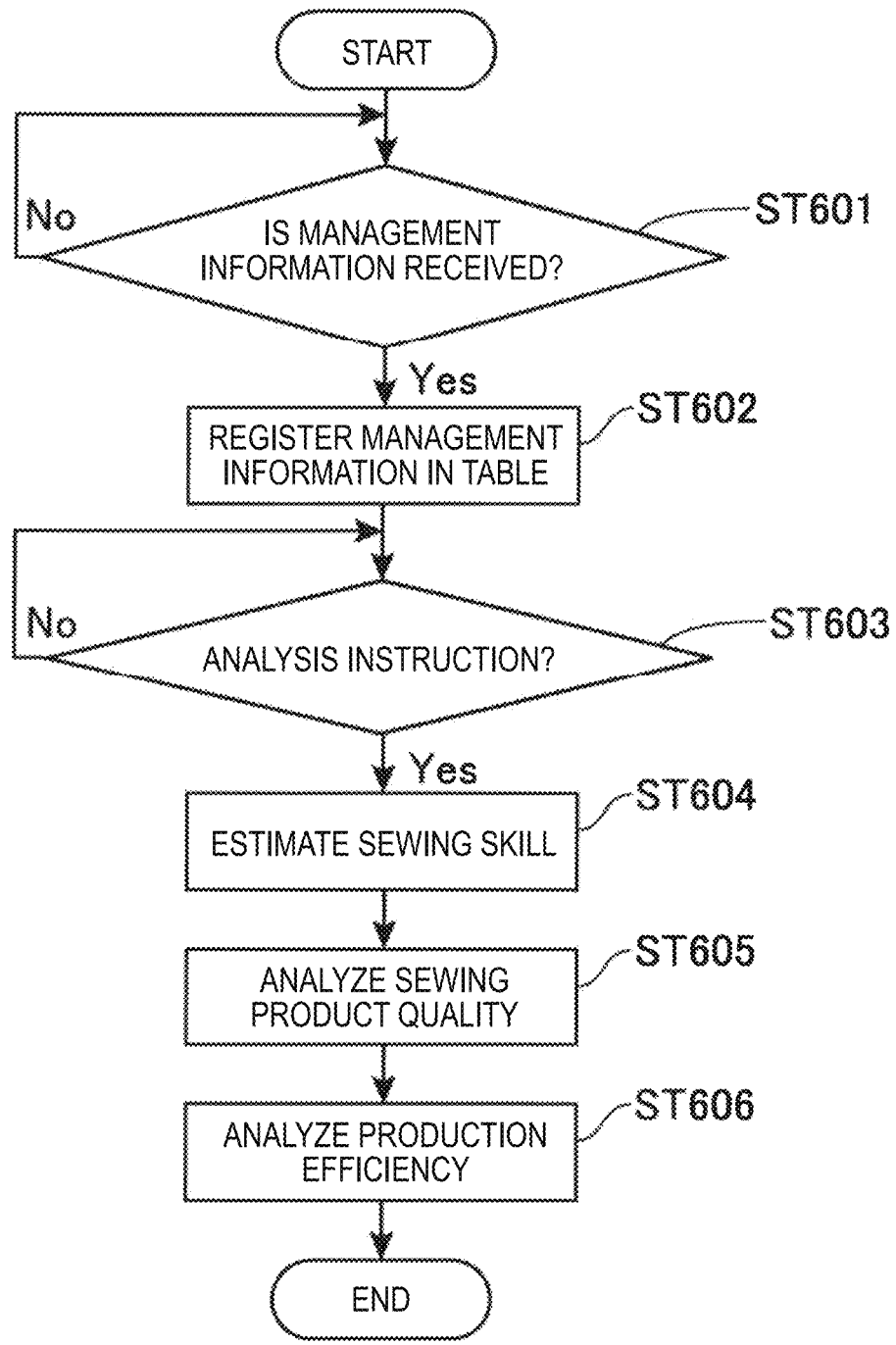
FIG. 6 is a flowchart illustrating analysis processing in the management server.

Based upon the production management information registered in the production management information table in this manner, the management server 8 estimates the sewing skill of the operator, and analyzes the sewing product quality and the production efficiency in the sewing line SL according to the estimation result. Hereinafter, such analysis processing in the management server 8 will be described with reference to FIG. 6. FIG. 6 is a flowchart illustrating analysis processing in the management server 8 according to the embodiment. In FIG. 6, the production management information is indicated as "management information", and the production management information table 500 is indicated as a "table".

As illustrated in FIG. 6, in the management server 8, the control unit 81 constantly monitors whether to receive the production management information from the facilities of various processes of the sewing management system 1 (step (hereinafter, referred to as "ST") 601). When not receiving the production management information from the facilities of various processes (ST 601: No), the control unit 81 continues this monitoring operation. A content of the production management information determined in ST 601 is set in advance by the administrator of the sewing management system 1 in the management server 8.

On the other hand, when the production management information is received from the facilities of various processes (ST 601: Yes), the table management unit 86 registers the received production management information in the production management information table 500 (ST 602). The production management information is recorded in the storage unit 82 via the communication unit 85 under the control of the control unit 81. The table management unit 86 registers the production management information stored in the storage unit 82 in various items of the production management information table 500 based upon the item number ID.

In the process of registering the production management information, the control unit 81 determines whether to receive an instruction for analyzing the sewing product quality and the production efficiency in the sewing line SL via the input unit 84 from the administrator (ST 603). When not receiving the instruction for analyzing the sewing product quality and the production efficiency (ST 603: No), the control unit 81 continues this determination operation. While the determination operation continues, the production management information is further registered in the production management information table 500.

When receiving the instruction for analyzing the sewing product quality and the production efficiency (ST 603: Yes), the control unit 81 estimates the sewing skill of the operator based upon the production management information registered in the production management information table 500 (ST 604). The sewing skill is estimated by comprehensively considering that the operator can use various sewing machines and can cope with various processes, and here, the estimation of the sewing skill in one process will be described. The sewing skill estimated in ST 604 indicates how many products satisfying a predetermined standard can be sewn within a predetermined time.

Here, a case in which the sewing skill of the operator is estimated by using the production management information of numbers #1 to #3 registered in the production management information table 500 as an example will be considered. Here, based upon the content of the production management information illustrated in FIG. 5, the control unit 81 estimates that the sewing skills of the operators of OP1 and OP2 are equal to or higher than a certain level, whereas the control unit 81 estimates that the sewing skill of the operator of OP3 is lower than the certain level.

For example, the control unit 81 can estimate the sewing skill of the operator from the contents of the operation data 1 and 2 registered in the production management information table 500 (more specifically, contents of the operation data 1 and 2 in comparison with the standard parameters 1 and 2). Here, OP1 and OP2 work with the contents of the operation data 1 and 2 (TS3 and NS3) with respect to the contents of the standard parameters 1 and 2 (TS2 and NS2), whereas OP3 works with the contents of operation data 1 and 2 (TS1 and NS1) with respect to the contents of the standard parameters 1 and 2 (TS2 and NS2). Therefore, the control unit 81 estimates that the sewing skills of the operators of OP1 and OP2 are equal to or higher than the certain level, whereas the control unit 81 estimates the sewing skill of the operator of OP3 is lower than the certain level.

The control unit 81 can estimate the sewing skill of the operator from the inspection result of the product of the operator registered in the production management information table 500. Here, the inspection results of the products of the operators of OP1 and OP2 are the number of defects "0", whereas the inspection result of the product of the operator of OP3 is the number of defects "3". Therefore, the control unit 81 estimates that the sewing skills of the operators of OP1 and OP2 are equal to or higher than the certain level, whereas the control unit 81 estimates that the sewing skill of the operator of OP3 is lower than the certain level. It can be seen that the sewing skill of the operator estimated based upon the inspection result of the product represents the quality (the sewing product quality) of the product sewn by the operator.

The control unit 81 can estimate the sewing skill of the operator from the work volume data registered in the production management information table 500. Here, the work volume data of the products of the operators of OP1, OP2, and OP3 are 100 pieces, 80 pieces, and 60 pieces, respectively. Therefore, the control unit 81 estimates that the sewing skill of the operator decreases in the order of OP1, OP2, and OP3. It can be seen that the sewing skill of the operator estimated based upon the work volume data of the product represents the work efficiency of the operator.

When estimating the sewing skill of the operator as described above, it is desirable that the control unit 81 considers the defect data of the sewing machine 9 specified by the sewing machine ID (the number of times of occurrence of the defect occurring in the sewing machine 9). For example, it is possible to accurately estimate the original sewing skill of the operator by considering the influence of the defect data of the sewing machine 9 on the work volume data and the inspection result data.

Hereinabove, for the convenience of description, it is described whether the sewing skill of the operator is higher or lower than the certain level. That is, a case in which the sewing skill of the operator is estimated in two stages is shown. However, the estimation standard of the sewing skill of the operator is not limited thereto. In order to accurately estimate the sewing skill of the operator, it is desirable as an embodiment to numerically describe the sewing skill based upon a plurality of predetermined stages. Here, the sewing skill of the operator is numerically described by comprehensively determining the contents of various types of production management information included in the production management information table 500.

For example, it is conceivable that a point is added or subtracted in response to the content of each item based upon the value of the work volume data in the production management information. For example, when the sewing time and the sewing speed of the standard parameters 1 and 2 are increased, the points are respectively added (for example, five points are added), whereas when the sewing time and the sewing speed thereof are decreased, the points are respectively subtracted (for example, five points are subtracted). The points are added or subtracted in response to the number of defects of the inspection result data. The value of the defect data is added by the value.

When the points are added and subtracted in this manner, the sewing skills of the operators of OP1, OP2, and OP3 are respectively obtained as follows.

(Sewing Skill of the Operator of OP1)

100(work volume data)+10(change of setting parameters 1 and 2)+0(inspection result data)+0(defect data)=100

(Sewing Skill of the Operator of OP2)

80(work volume data)+10(change of setting parameters 1and 2)+0(inspection result data)+0(defect data)=80

(Sewing Skill of the Operator of OP3)

60(work volume data)−10(change of setting parameters 1 and 2)−3(inspection result data)+10(defect data)=57

Therefore, here, it is estimated that the sewing skill of OP1 is the highest, and the sewing skill is high in the order of OP2 and OP3. The sewing skill estimated in this manner is registered in the sewing skill table (refer to FIG. 7). As illustrated in FIG. 7, in the sewing skill table, the sewing skills (more specifically, a value corresponding to the sewing skill) are registered in association with the operator ID and the process ID.

After estimating the sewing skill of the operator, the control unit 81 analyzes the sewing product quality of the sewing line SL (ST 605). For example, the control unit 81 comprehensively determines the sewing skill of the operator estimated in ST 604, and analyzes the sewing product quality of the sewing line SL. For example, the control unit 81 can analyze the sewing product quality of the sewing line SL by considering the numerical value of the sewing skill described above of the operator disposed in the sewing line SL. When the sewing skill value of the operator is equal to or higher than a predetermined value, the control unit 81 can analyze that the sewing product quality in the sewing line SL is high, whereas when the value is lower than the predetermined value, the control unit 81 can analyze that the sewing product quality in the sewing line SL is low.

When analyzing the sewing product quality in the sewing line SL, it is desirable as an embodiment that the production management information is multiplied by a coefficient that increases the value of the item (for example, the value of the inspection result data) directly representing the sewing product quality. Here, it is possible to more accurately analyze the sewing product quality in the sewing line SL.

After analyzing the sewing product quality in the sewing line SL, the control unit 81 analyzes the production efficiency of the sewing line SL (ST 606). For example, the control unit 81 comprehensively determines the sewing skill of the operator estimated in ST 604 and analyzes the work efficiency of the sewing line SL. For example, the control unit 81 can analyze the work efficiency of the sewing line SL by adding the numerical value of the sewing skill described above to the operator disposed in the sewing line SL. When the added value of the sewing skill of the operator is equal to or higher than a predetermined value, the control unit 81 can analyze that the work efficiency in the sewing line SL is high, whereas when the added value is smaller than the predetermined value, the control unit 81 can analyze that the work efficiency in the sewing line SL is low.

When analyzing the work efficiency of the sewing line SL, it is desirable as an embodiment that the production management information is multiplied by a coefficient that increases the value of the item (for example, the value of the work volume data) directly representing the work efficiency. Here, it is possible to more accurately analyze the work efficiency in the sewing line SL.

Such an analysis result is displayed on the display unit 83, whereby the administrator of the management server 8 can confirm the analysis result of the sewing product quality and the production efficiency in the sewing line SL. Next, according to the analysis result, it is possible to specify a location where the sewing quality and the production efficiency are low in the sewing line SL. Accordingly, the administrator can take measures for improving the sewing product quality and the production efficiency such as, for example, rearrangement of the operator and training of the sewing skill.

As described above, in the sewing management system 1 according to the embodiment, since the production management information including the operator ID and the operation information of the sewing machine 9 is managed for each process of producing the product to be sewn in the sewing line SL, an operation state of the sewing machine 9 by the operator working in the sewing line SL can be specified for each process, and thus the sewing skill of the operator can be estimated. Accordingly, the management server 8 can improve the sewing product quality and the production efficiency in the sewing line SL by setting the personnel arrangement in the sewing line SL.

Particularly, in the sewing management system 1, the sewing machine 9 transmits the sewing machine ID to the management server 8 as the production management information. The management server 8 registers and manages the sewing machine ID transmitted from the sewing machine 9 in the production management information table. Therefore, the management server 8 can estimate the sewing skill of the operator when combined with the specific sewing machine 9 for each process. Since the sewing machine ID and its operation information are managed, the management server 8 can estimate an occurrence state of the defect of the sewing machine 9.

In the sewing management system 1, the sewing machine 9 transmits the work volume data to the management server 8 as the production management information. The management server 8 registers and manages the work volume data transmitted from the sewing machine 9 in the production management information table. As described above, in the production management information table, since the number of products (work volume) sewn by the sewing machine 9 is managed as the production management information, the management server 8 can appropriately estimate the sewing skill relating to the work efficiency of the operator for each process according to the number of products.

The sewing management system 1 includes an inspection machine as an inspection device for receiving the input of the inspection result of the product in the inspection process 6. The inspection result inputted from the inspection machine is transmitted to the management server 8 via the portable terminal 60. The management server 8 registers and manages the inspection result data transmitted from the portable terminal 60 in the production management information table. Since the inspection result of the product is managed by the management server 8 in this manner, the management server 8 can appropriately estimate the sewing skill relating to the sewing product quality of the operator for each item number according to the inspection result.

The sewing management system 1 includes the position detecting device 41 as a detecting device for detecting the position information of the operator. The position information of the operator detected by the position detecting device 41 is outputted to the management server 8. The management server 8 registers and manages the position information of the operator in the production management information table. Accordingly, the management server 8 can estimate a relationship between the position information of the operator and the sewing state of the product.

A technology of the present disclosure is not limited to the embodiments and modified examples, and may be variously changed, replaced, and modified without departing from the spirit of the technical idea. When the technical idea can be implemented in a different method by the progress of the technology or by another derived technology, the technical idea may be implemented by using the different method. Therefore, the scope of claims covers all the embodiments that may be included within the scope of the technical idea.

For example, in the embodiment, a case in which the operator ID and the item number ID are read by the portable terminal 40 connected to the sewing machine 9 is described. However, the configuration for reading the operator ID and the item number ID is not limited thereto, and can be appropriately changed. For example, a configuration in which the sewing machine 9 reads the operator ID and the item number ID may be provided. In the embodiment, the sewing machine 9 is provided with the communication unit 98 for performing communication with the management server 8 via the network NW2 of the sewing management system 1, and in the case of a sewing machine that does not include the communication unit 98, the portable terminal 40 may be provided with the communication function. In the embodiment, the portable terminals 30, 50, 60, and 70 are configured to be provided in various processes of forming the sewing line SL, and when the facilities used in various processes of the cutting machine, the iron press machine, and the inspection machine are provided with the communication function of performing the communication with the management server 8 via the network, the portable terminal may not be provided.

In the embodiment, a case in which the production management information is managed by the process unit of the component forming the product according to the item number ID in the production management information table is described. However, a management method of the production management information is not limited thereto, and can be appropriately changed. For example, the production management information may be managed by the process unit of the product according to the item number ID associated with the product.

In the embodiment, a case in which the management server 8 is connected to the network NW2 of the sewing line SL of the sewing factory SP1 is described. However, the configuration of the management server 8 is not limited thereto, and can be appropriately changed. For example, the management server 8 may be connected to the network NW1 that connects a plurality of sewing factories. The function of the management server 8 may be provided on the cloud. The management server 8 is not limited to the case where the management server 8 is configured independently of the sewing line SL, and for example, a PC disposed in the execution region of the specification generation process 2 may be allowed to have the function.

Hereinafter, characteristics of the embodiments will be summarized.

A sewing management system according to the embodiment includes: a sewing device that transmits production management information including identification information of an operator and operation information of a device main body; and a management device that manages the production management information by a process of a product sewn in a sewing line or by a process unit of a component forming the product. According to the configuration, since the production management information including the identification information of the operator and the operation information of the sewing device is managed by the process of the product sewn in the sewing line or by the process unit of the component forming the product, it is possible not only to specify the operation state of the sewing device by the operator working in the sewing line for each product or each component, but also to estimate the sewing skill of the operator. Accordingly, it is possible to improve the sewing product quality and the production efficiency in the sewing line by setting personnel arrangement in the sewing line.

In the sewing management system according to the embodiment, the sewing device transmits identification information of the device main body as the production management information. According to the configuration, since the identification information of the sewing device is managed as the production management information, it is possible to estimate the sewing skill of the operator when combined with a specific sewing device for each process of the product or for each process of the component. Since the identification information of the sewing device and the operation information thereof are managed, it is possible to estimate the occurrence state of the defect of the sewing device.

In the sewing management system according to the embodiment, the sewing device transmits the number of products sewn by the device main body as the production management information. According to the configuration, the number of products (work volume) sewn by the sewing device is managed as the production management information, it is possible to estimate the sewing skill of the operator for each process of the product or for each process of the component according to the number of products.

The sewing management system according to the embodiment further includes an inspection device that receives input of an inspection result of the product sewn in the sewing line, and the management device manages the inspection result inputted from the inspection device as the production management information. According to the configuration, since the inspection result of the product is managed as the production management information such that the inspection result of the product can be managed by the management device, the sewing skill of the operator relating to the sewing product quality can be appropriately estimated for each item number according to the inspection result.

In the sewing management system according to the embodiment, the management device estimates the sewing skill of the operator based upon the production management information. According to the configuration, since the sewing skill of the operator is estimated based upon the production management information such that it is possible to specify operator's suitability with respect to the process, it is possible to take measures for improving the sewing product quality and the production efficiency such as rearrangement of the operator and training of the sewing skill.

In the sewing management system according to the embodiment, the management device analyzes sewing product quality and/or production efficiency in the sewing line based upon the sewing skill of the operator. According to the configuration, since the sewing product quality and/or the production efficiency in the sewing line is analyzed based upon the sewing skill of the operator such that a location where the sewing product quality and the production efficiency are low in the sewing line can be specified, it is possible to take measures for improving the sewing product quality and the production efficiency such as the rearrangement of the operator.

In a sewing management method according to the embodiment, the sewing management method using a sewing device that performs sewing in a sewing line and a management device that manages various information in the sewing line includes: transmitting, from the sewing device, production management information including identification information of an operator and operation information of the sewing device body; and managing, by the management device, the production management information by a process of a product sewn in the sewing line or by a process unit of a component forming the product. According to the configuration, since the production management information including the identification information of the operator and the operation information of the sewing device is managed by the process of the product sewn in the sewing line or by the process unit of the component forming the product, it is possible not only to specify an operating state of the sewing device by the operator working in the sewing line for each process of the product or for each process of the component, but also to estimate the sewing skill of the operator. Accordingly, the sewing product quality and the production efficiency in the sewing line can be improved by setting the personnel arrangement in the sewing line.

What is claimed is:

1. A sewing management system, comprising:
    a sewing device that transmits a production management information including an identification information of an operator and an operation information of a device main body; and
    a management device that manages the production management information by a process unit of (i) a product sewn in a sewing line or (ii) a component, which forms the product, sewn in the sewing line,
    wherein the sewing line comprises (i) a cutting process of cutting a workpiece, (ii) a sewing process of sewing the workpiece cut in the cutting process, (iii) an inspection process of inspecting the workpiece sewn in the sewing process, and (iv) a packing process of packing the workpiece inspected in the inspection process.

2. The sewing management system according to claim 1, wherein
    the sewing device transmits the identification information of the device main body as the production management information.

3. The sewing management system according to claim 1, wherein
    the sewing device transmits the number of products sewn by the device main body as the production management information.

4. The sewing management system according to claim 1, wherein the management device manages the production management information by the process unit of the product sewn in the sewing line, further comprising:
    an inspection device that receives input of an inspection result of the product sewn in the sewing line, the inspection result being based on the product in a finished state, and transmits the received input of the inspection result to the management device.

5. The sewing management system according to claim 1, wherein
    the management device estimates a sewing skill of the operator based upon the production management information.

6. The sewing management system according to claim 5, wherein
    the management device analyzes at least one of (i) sewing product quality and (ii) production efficiency in the sewing line based upon the sewing skill of the operator.

7. The sewing management system according to claim 1, further comprising:
    a position detecting device that detects a position information of the operator, wherein
    the management device manages the position information of the operator detected by the position detecting device as the production management information.

8. A sewing management method using a sewing device that performs sewing in a sewing line and a management device that manages various information in the sewing line, the method comprising:
    transmitting, from the sewing device, a production management information including an identification information of an operator and an operation information of the sewing device body; and
    managing, by the management device, the production management information (i) by a process unit of a product sewn in the sewing line or (ii) by a process unit of a component, which forms the product, sewn in the sewing line,
    wherein the sewing line comprises (i) a cutting process of cutting a workpiece, (ii) a sewing process of sewing the workpiece cut in the cutting process, (iii) an inspection process of inspecting the workpiece sewn in the sewing process, and (iv) a packing process of packing the workpiece inspected in the inspection process.

* * * * *